US007114229B1

(12) United States Patent
Nago

(10) Patent No.: US 7,114,229 B1
(45) Date of Patent: Oct. 3, 2006

(54) TUBE INSERT INSTALLING TOOL

(75) Inventor: Daisuke Nago, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/330,967

(22) Filed: Jan. 13, 2006

(51) Int. Cl.
*B23P 19/04* (2006.01)

(52) U.S. Cl. ............................. 29/237; 29/278; 269/96

(58) Field of Classification Search .................. 29/237, 29/238, 267–268, 278; 269/96
See application file for complete search history.

(56) References Cited

U.S. PATENT DOCUMENTS 2,415,896 A * 2/1947 Bly et al. .............. 29/243.517
6,550,119 B1 * 4/2003 Ishida et al. .................. 29/237

FOREIGN PATENT DOCUMENTS

JP 05-272663 A 10/1993
JP 2582712 B 11/1996
JP 2604397 3/2000
JP 2003-245869 A 9/2003
JP 3567285 B 6/2004
JP 2004-230490 A 8/2004
JP 2004-230490 A 9/2004
JP 2005-131758 A 5/2005

* cited by examiner

*Primary Examiner*—Lee D. Wilson
(74) *Attorney, Agent, or Firm*—Global IP Counselors, LLP

(57) ABSTRACT

A tube insert installing tool includes first and second tube gripping portions, a tube insert supporting portion and a user actuation portion. The first and second tube gripping portions are configured to engage an end part of a tube. The tube insert supporting portion is configured to support a tube insert. The user actuation portion is operatively coupled to the first and second tube gripping portions to move the first and second tube gripping portions between an open release orientation and a tube gripping orientation. The user actuation portion includes an insert pressing part configured and arranged to push the tube insert into the end part of the tube during subsequent movement of the user actuation portion in a single movement of the user actuation portion from the open release orientation to a final tube insertion orientation.

20 Claims, 7 Drawing Sheets

TUBE INSERT INSTALLING TOOL

BACKGROUND OF THE INVENTION

1. Field of the Invention

This invention generally relates to a tube insert installing tool. More specifically, the present invention relates to tube insert installing tool that simultaneously grips a tube and installs an insert into the tube.

2. Background Information

Hydraulic tubes are well known for use in braking systems in vehicles and bicycles. Such tubes are typically light and flexible but require the installation of special fittings or inserts on their respective ends for proper installation and usage. Tools for installing inserts typically include two separate mechanisms, such as a gripping mechanism and a pressing mechanism. The gripping mechanism clamps or grips the tube and the other mechanism flares the end or presses an insert into the tube.

A problem with such tools is that the gripping mechanism and the pressing mechanism are separately operated requiring several operational steps. Operating such tools can be cumbersome and time consuming.

In view of the above, it will be apparent to those skilled in the art from this disclosure that there exists a need for an improved tool that simplifies the tube insert installing process. This invention addresses this need in the art as well as other needs, which will become apparent to those skilled in the art from this disclosure.

SUMMARY OF THE INVENTION

One object of the present invention is to configure a tube insert installing mechanism such that gripping a tube and installing an insert are accomplished in a simple and easy manner.

Another object of the present invention is to provide a tool with a gripping mechanism and an insert pressing mechanism that are operated by a single user actuation portion.

The foregoing objects can basically be attained by providing a tube insert installing tool with a first tube gripping portion, a second tube gripping portion, a tube insert supporting portion and a user actuation portion. The first and second tube gripping portions are configured to engage an end part of a tube. The tube insert supporting portion is configured to support a tube insert. The user actuation portion is operatively coupled to the first and second tube gripping portions to move the first and second tube gripping portions between an open release orientation and a tube gripping orientation. The user actuation portion includes an insert pressing part configured and arranged to push the tube insert supported by the tube insert supporting portion into the end part of the tube during subsequent movement of the user actuation portion in a single movement of the user actuation portion from the open release orientation to a final tube insertion orientation.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
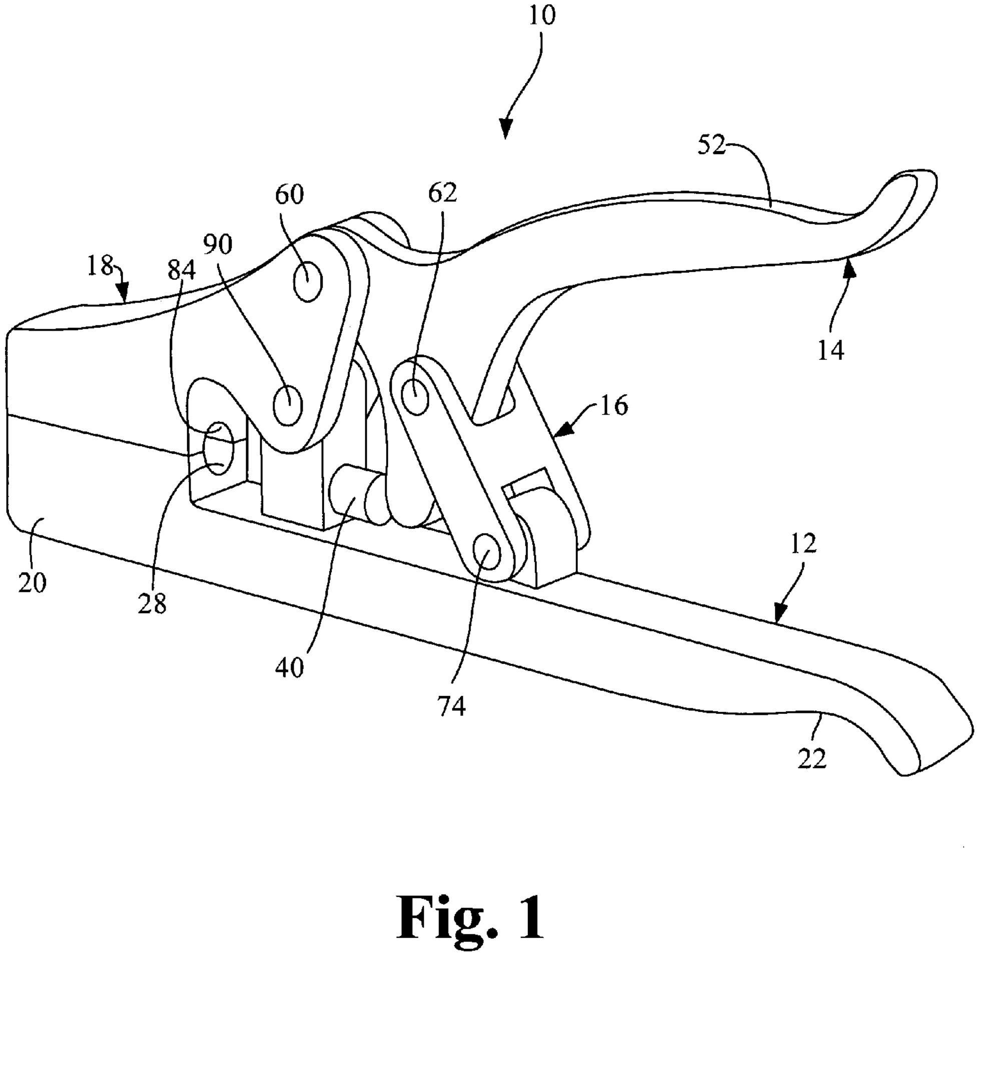
FIG. 1 is a perspective view of a tube insert installing tool operable between an open release orientation and a final tube insertion orientation, shown in a tube gripping orientation (an intermediate orientation) between the open release orientation and the final tube insertion orientation, with a movable gripping member and a gripping portion of a first operating member positioned to grip a tube and a pressing protrusion of a second operating member moved into contact with a pressing part of the first operating member in accordance with the present invention.
Figure 2:
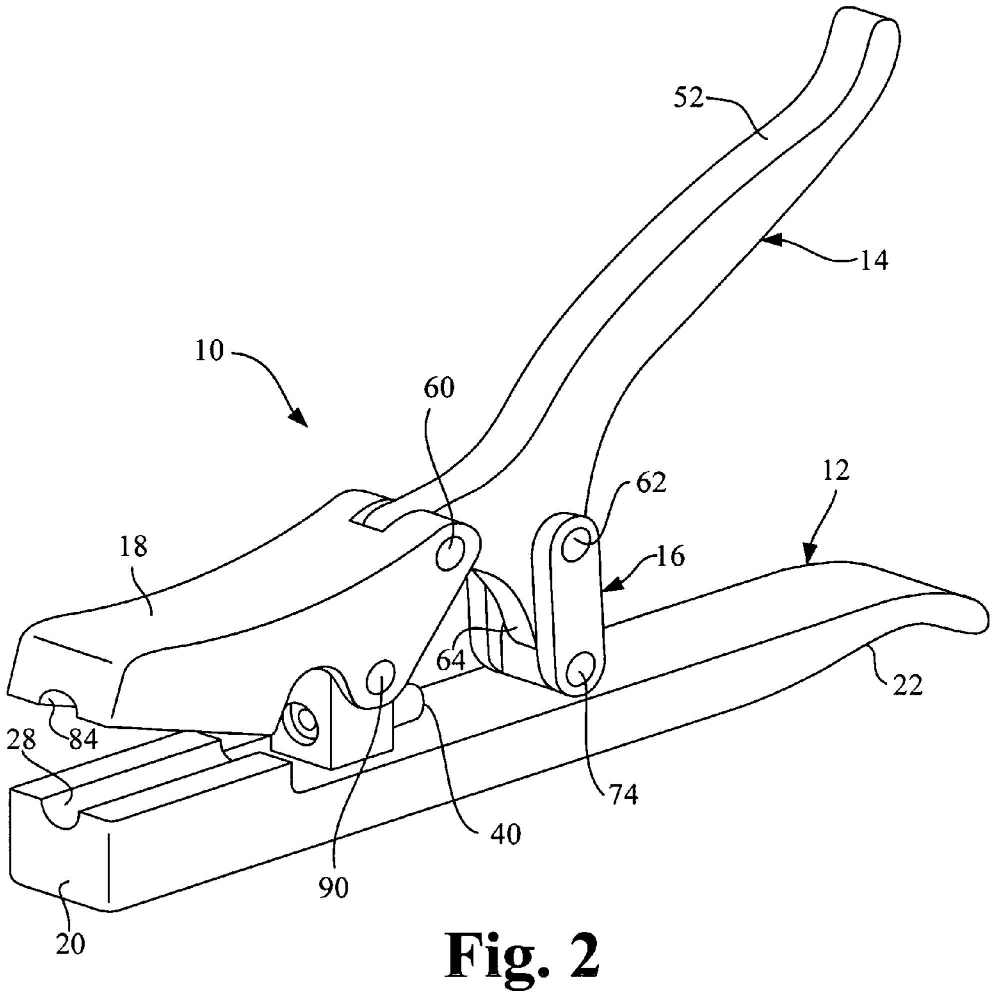
FIG. 2 is another perspective view showing the tube insert installing tool from a reverse angle, with the tube insert installing tool shown in the open release orientation in accordance with the present invention.

Referring initially to FIGS. 1 and 2, a tube insert installing tool 10 is illustrated in accordance with a first embodiment of the present invention.

The tube insert installing tool 10 basically includes a first operating member 12, a second operating member 14, a pivot link 16 and a movable gripping member 18. The second operating member 14 is pivotally coupled to the first operating member 12 by the pivot link 16. The movable gripping member 18 is pivotally coupled to the first operating member 12 and pivotally coupled to the second operating member 14. The second operating member 14 is pivotable or movable relative to the first operating member 12 between an open release orientation (shown in FIGS. 2, 8, 9 and 13) and a final tube insertion orientation shown in FIG. 12, as described in greater detail below. The tube insert installing tool 10 is configured and arranged to grip a tube T and push a tube insert I (FIGS. 8–13) into an end part of the tube T (FIGS. 8–13) in a single movement of second operating member 14 of the tube insert installing tool 10, as described in greater detail below.

It should be understood from the drawings and the description herein that the first actuating portion 22 and the second actuating portion 52, along with other portions of the tube insert installing 10 generally define a user actuation portion of the present invention.

Figure 3:
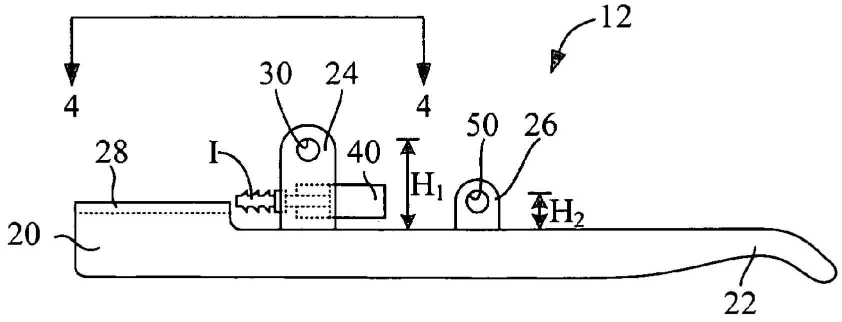
FIG. 3 is a side elevational view of the first operating member of the tube insert installing tool with other members removed to provide greater clarity in accordance with the present invention.
Figure 4:
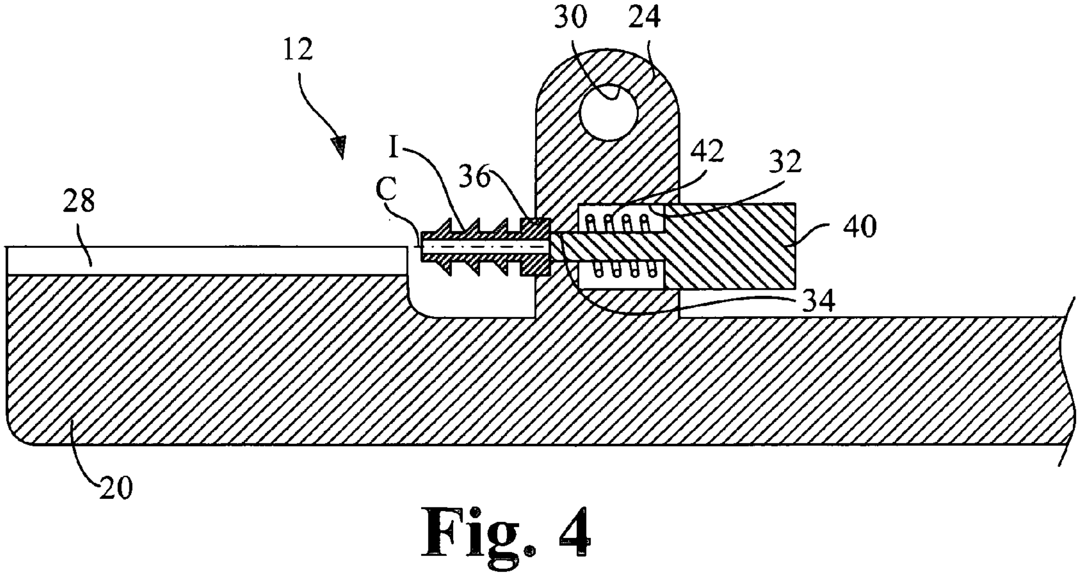
FIG. 4 is a cross sectional view of a portion of the first operating member of the tube inert installing tool taken along the line 4—4 in FIG. 3 in accordance with the present invention.

With specific reference to FIGS. 3 and 4, the first operating member 12 basically includes a first gripping portion 20, a first actuating portion 22, a first projection 24 and a second projection 26 (shown in FIG. 3).

The first gripping portion 20 includes a surface formed with a semi-circular tube receiving recess 28 shown in FIGS. 1–4 and 8–13. As shown in FIG. 4, the recess 28 extends the length of the first gripping portion 20 from a distal end of the first gripping portion 20 toward the first projection 24. The recess 28 has a central axis C and is dimensioned with a radius that is the same or slightly smaller that the radius of the tube T. The recess 28 is configured to work in concert with the movable gripping member 18 to selectively retain the tube T in a manner described in greater detail below.

Referring to again to FIG. 3, the first actuating portion 22 (a first handle) basically includes an elongated handle having a curved end provided to accommodate an operator's hand.

With specific reference to FIG. 4, the first projection 24 of the first operating member 12 basically includes a pivot pin bore 30, a first bore 32, a second bore 34 and an insert supporting recess 36. As shown in FIG. 3, the approximate center of the pivot pin bore 30 is located at a height $H_1$ above the surface of the first actuating portion 22. The first and second bores 32 and 34 are oriented in a longitudinal direction parallel to the first actuating portion 22 and perpendicular to the lateral extending direction of the pivot pin bore 30.

The first and second bores 32 and 34 are preferably concentric with the first bore 32 having a diameter larger than that of the second bore 34. Further, the first and second bores 32 and 34 are preferably aligned with the central axis C of the recess 28, as indicated in FIG. 4. The insert supporting recess 36 is also concentric with the first and second bores 32 and 34. The insert supporting recess 36 is dimensioned to receive and removably support the tube insert I. Preferably, the insert supporting recess 36 is a tube insert supporting portion dimensioned to snuggly receive and hold the head of the insert I therein.

Figure 12:
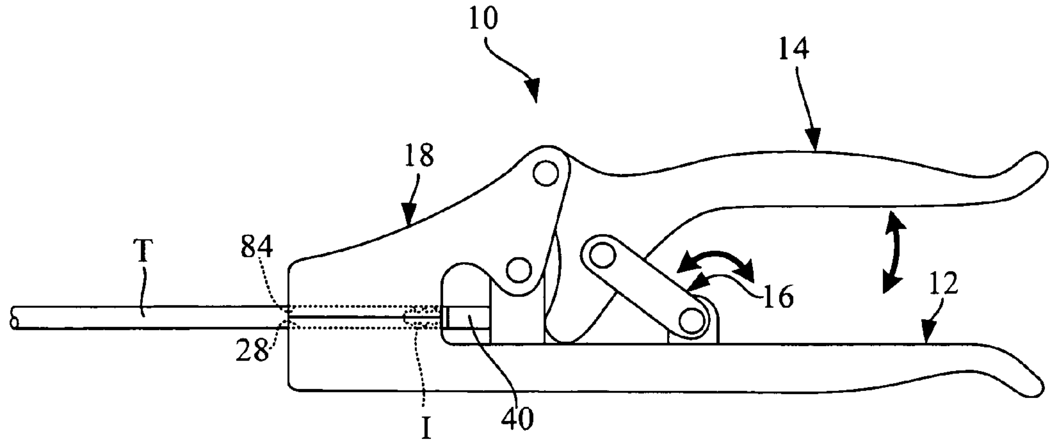
FIG. 12 is a side elevational view of the tube insert installing tool shown in the final tube insertion orientation, with the pressing part of the first operating member forcing the insert into the tube in accordance with the present invention.

As shown in FIG. 4, a pressing part 40 and a return spring 42 are disposed within the first bore 32. The pressing part 40 is an insert pressing part configured to push the insert I into the tube T in a manner described in greater detail below. The pressing part 40 is basically a piston that has two concentric portions, a large diameter portion and a smaller diameter portion. The large diameter portion of the pressing part 40 is slidably disposed generally within the first bore 32 and the smaller diameter portion slidably extends into the second bore 34. When moved against the biasing of the return spring 42, the pressing part 40 extends past the first projection 24 and the insert supporting recess 36 and toward the first gripping portion 20, as indicated in FIG. 12.

The spring 42 is disposed within the first bore 32 between the large diameter portion of the pressing part 40 and the second bore 34. The spring 42 biases the pressing part 40 away from the insert supporting recess 36.

With specific reference to FIG. 3, the second projection 26 is formed with a pivot pin bore 50 that is preferably parallel to the pivot pin bore 30 of the first projection 24. The approximate center of the pivot pin bore 50 is located at a height $H_2$ above the surface of the first actuating portion 22. As shown in FIG. 3, the height $H_1$ is greater than the height $H_2$.

Figure 5:
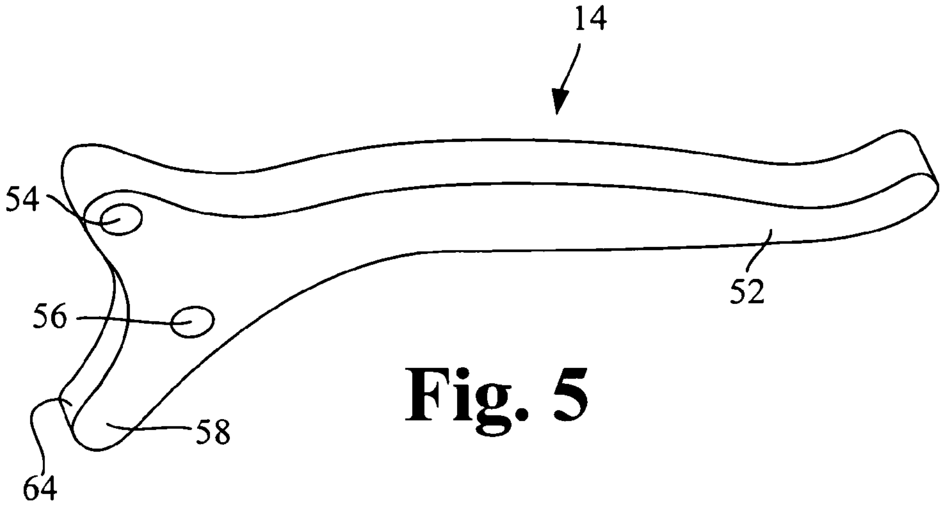
FIG. 5 is a perspective view of the second operating member of the tube insert installing tool with other members removed to provide greater clarity in accordance with the present invention.

With specific reference to FIG. 5, the second operating member 14 basically includes a second actuating portion 52, a first pivot bore 54, a second pivot bore 56 and a pressing protrusion 58 (another insert pressing part). The second actuating portion 52 (a second handle) is a handle that includes has a curved end provided to accommodate an operator's hand. The first pivot bore 54 receives a first pivot pin 60 (FIGS. 1 and 2) that pivotally couples the second operating member 14 to the movable gripping member 18. The second pivot bore 56 is generally parallel to the first pivot bore 54 and receives a second pivot pin 62 (FIGS. 1 and 2) that pivotally couples the second operating member 14 to the pivot link 16 and in a spaced apart manner to the first operating member 12.

The pressing protrusion 58 extends below the second pivot bore 56 and includes a contact surface 64 configured for contacting the pressing part 40 upon movement of the second operating member 14 from the open release orientation (FIG. 8) toward the tube gripping orientation (FIG. 12). Specifically, the contact surface 64 is configured and arranged to initially be spaced from the insert pressing part 40 during movement from the open release orientation to a tube gripping orientation and to subsequently engage the insert pressing part 40 during movement from the tube gripping orientation to the final tube insertion orientation to move the insert pressing part 40, which in turn urges the tube insert into the end part of the tube.

Figure 6:
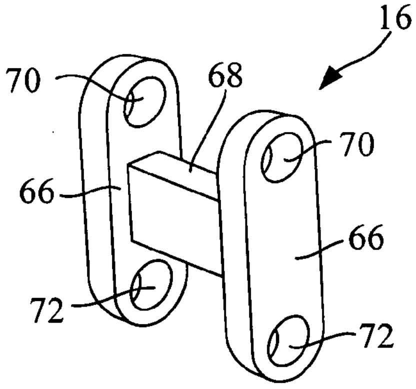
FIG. 6 is a perspective view of a link member of the tube insert installing tool with other members removed to provide greater clarity in accordance with the present invention.

With reference to FIG. 6, the pivot link 16 is now described. The pivot link 16 basically includes two generally parallel link portions 66 and a gusset 68 extending therebetween. The link portions 66 are formed at opposite ends thereof with pivot pin bores 70 and 72. The pivot pin bores 70 receive the second pivot pin 62 such that the pivot link 16 is pivotally coupled to the second operating member 14. The pivot pin bores 72 receive a third pivot pin 74 (FIGS. 1 and 2). The third pivot pin 74 further extends through the pivot pin bore 50 of the second projection 26 of the first operating member 12. Consequently, the pivot link 16 is pivotally coupled to the first operating member 12. Further, the second operating member 14 is pivotally coupled to the first operating member 12 via the pivot link 16.

It should be understood from the drawings and the description herein that the pivot link 16 can alternatively include the link portions 66 without the gusset 68. Specifically, the gusset 68 is an optional portion that can be omitted depending upon design considerations.

Figure 7:
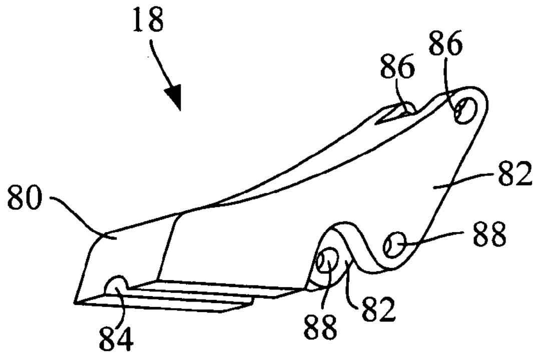
FIG. 7 is a perspective view of the movable gripping member of the tube insert installing tool with other members removed to provide greater clarity in accordance with the present invention.

With reference to FIG. 7, the movable gripping member 18 is now described. The movable gripping member 18 basically includes a second gripping portion 80 and a pair of generally parallel projections 82. The second gripping portion 80 includes a semi-circular tube receiving recess 84. Like the recess 28 of the first gripping portion 20 of the first operating member 12, the recess 84 extends the length of the second gripping portion 80 from a distal end thereof to the parallel projections 82. The recess 84 is dimensioned with a radius that is the same or slightly smaller that the radius of the tube T. The recess 84 is further configured to selectively retain the tube T in a manner described in greater detail below. The recesses 28 and 84 are parallel with one another and have parallel or very close common central axes when the first operating member 12 and the second operating member 14 are in the tube gripping orientation (FIG. 12). Although not shown, with the first operating member 12 and the second operating member 14 in the tube gripping orientation, a central axis of the recess 84 preferably coincides with or is at least proximate the central axis C of the recess 28.

The parallel projections 82 (lever parts) are formed with a first pair of pivot pin bores 86 (only one is shown in FIG. 7) and a second pair of pivot pin bores 88. The first pair of pivot pin bores 86 (a pivot section) receive the first pivot pin 60 thereby pivotally coupling the movable gripping member 18 to the first operating member 12. The second pair of pivot pin bores 88 (another pivot section) received a fourth pivot pin 90. The fourth pivot pin 90 further extends through the pivot pin bore 30 of the first projection 24 of the first operating member 12, thereby pivotally coupling the movable gripping member 18 to the first operating member 12.

The operation of the tube insert installing tool 10 is now described with specific reference to FIGS. 8–13. In this operation, the tube insert I is press fitted into a hollow interior of the tube T.

Figure 8:
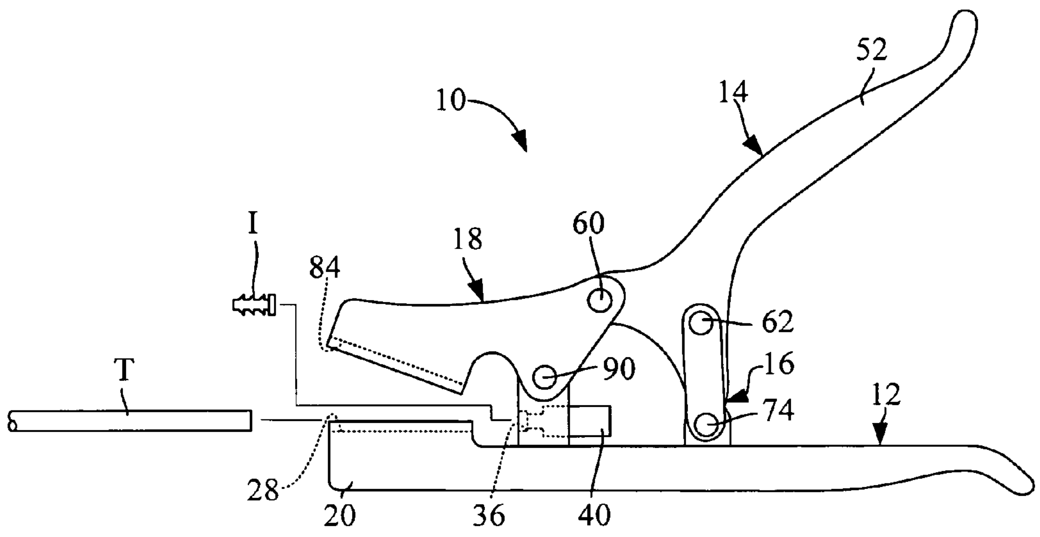
FIG. 8 is a side elevational view of the tube insert installing tool shown in the open release orientation ready to receive a tube and a tube insert in accordance with the present invention.

With reference to FIG. 8, the tube insert I is installed in the insert supporting recess 36 with the tube insert installing tool 10 in the open release orientation. Further, an end of the tube T is also placed in the recess 28 formed the first gripping portion 20 of the first operating member 12 with the tube insert installing tool 10 in the open release orientation.

Figure 9:
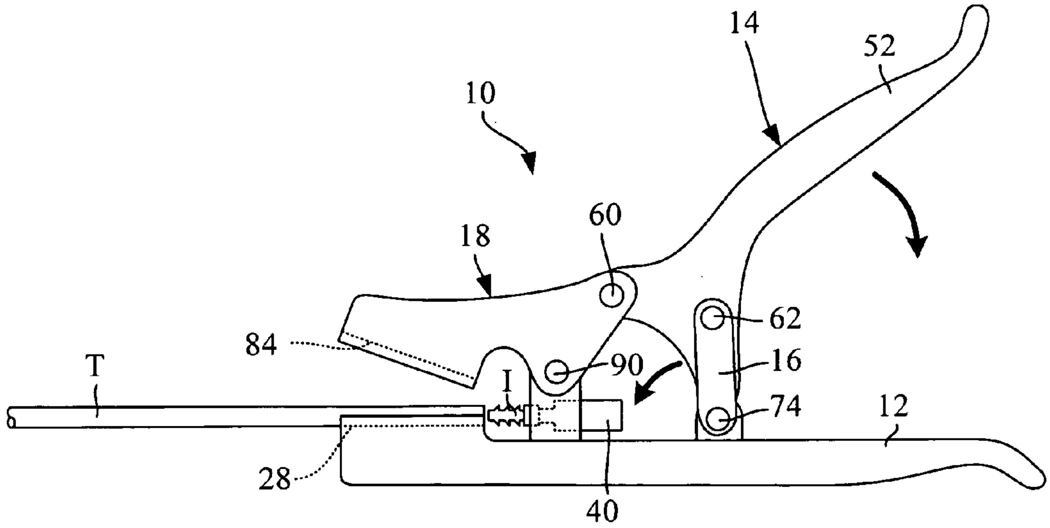
FIG. 9 is a side elevational view of the tube insert installing tool shown in the open release orientation with the tube and the tube insert positioned therein with the second operating member and link member ready to be moved toward the final tube insertion orientation in accordance with the present invention.

As shown in FIG. 9, with the tube insert I and the end of the tube T in position in the tube insert installing tool 10, the second actuating portion 52 of the second operating member 14 can be moved toward the first actuating portion 22 of the first operating member 12. During the initial movement from the open release orientation, the second actuating portion 52 of the second operating member 14 preferably pivots about the first pivot pin 60 urging the movable gripping member 18 to move toward the first gripping portion 20 of the first operating member 12 until the tube T engaged in the tube gripping orientation, shown in FIG. 10.

Figure 10:
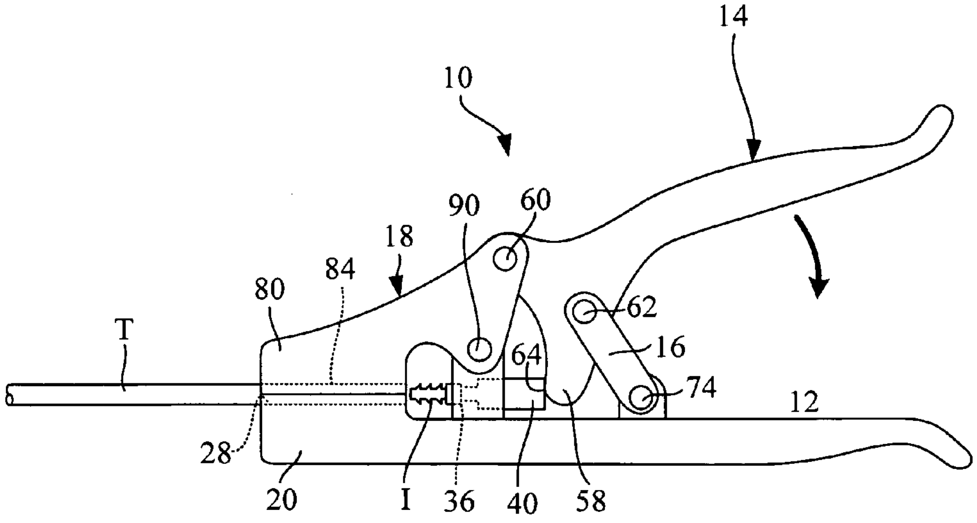
FIG. 10 is a side elevational view of the tube insert installing tool shown in a tube gripping orientation (an intermediate orientation) between the open release orientation and the final tube insertion orientation, with the movable gripping member and a gripping portion of the first operating member gripping the tube and a pressing protrusion of the second operating member moved into contact with a pressing part of the first operating member in accordance with the present invention.

As shown in FIG. 10, the first gripping portion 20 and the second gripping portion 80 are brought into contact with the Tube T clamping it in position against axial movement. Specifically, the Tube T is confined within the recesses 28 and 84. Continued movement of the second operating member 14 about the pivot pin 60 brings the pressing protrusion 58 into contact with the pressing part 40. It should be understood from the drawings and description herein that the pivot link 16 also pivots about the third pivot pin 74 as the second operating member 14 moves into the tube gripping orientation depicted in FIG. 10. Since the pressing part 40 is coaxial with the tube insert I (and the central axis C) the pressing part 40 pushes the tube insert I in a direction generally axially aligned with the tube receiving recesses 28 and 84.

Figure 11:
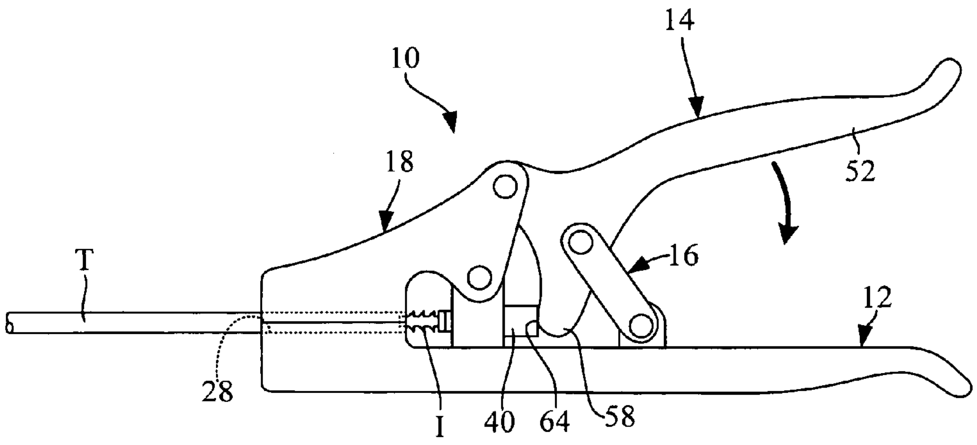
FIG. 11 is a side elevational view of the tube insert installing tool shown in a further intermediate orientation between the tube gripping orientation and the final tube insertion orientation, with the movable gripping member and a gripping portion of the first operating member gripping the tube and the pressing protrusion of the second operating member beginning to move the pressing part of the first operating member in accordance with the present invention.

As shown in FIG. 11, continued movement of the second actuating portion 52 of the second operating member 14 toward the first actuating portion 22 of the first operating member 12 causes the pressing protrusion 58 of the second operating member 14 to urge the pressing part 40 toward the first and second gripping portions 22 and 80. Consequently, the tube insert I is pushed toward the Tube T and out of the insert supporting recess 36.

As shown in FIG. 12, continued movement of the second actuating portion 52 of the second operating member 14 toward the first actuating portion 22 of the first operating member 12 brings the tool insert installing tool 10 to the final tube insertion orientation. Movement to the final tube insertion orientation causes the pressing protrusion 58 to urge the pressing part 40 further toward the first and second gripping portions 22 and 80. Consequently, the tube insert I is pressed into the Tube T.

Figure 13:
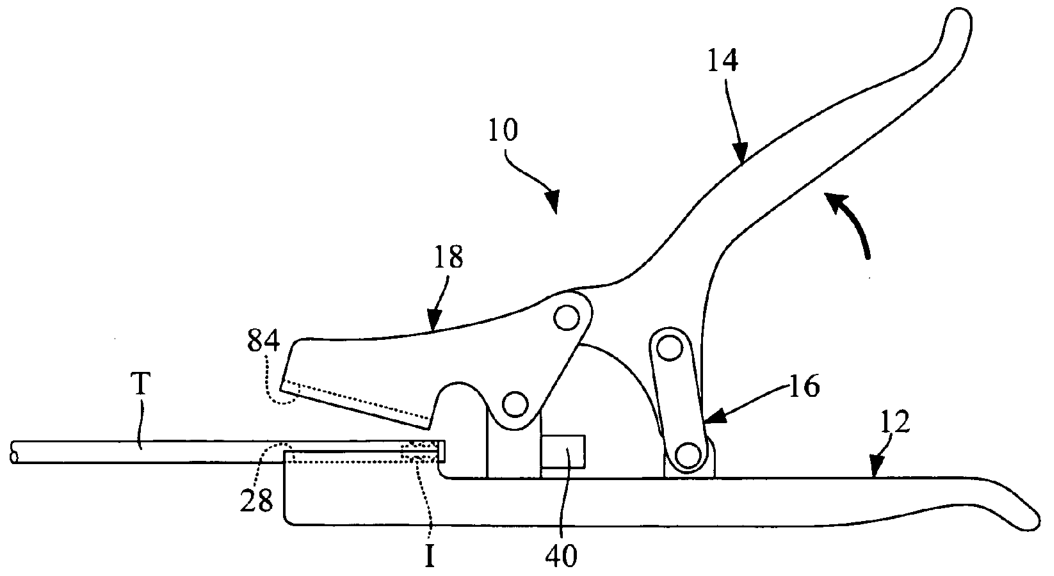
FIG. 13 is a side elevational view of the tube insert installing tool shown returned to the open release orientation, with the insert inserted and retained in the tube in accordance with the present invention.

As shown in FIG. 13, with the second actuating portion 52 of the second operating member 14 released and the tool insert installing tool 10 returned to the open release orientation, the Tube T can be easily removed from the tool with the tube insert I conveniently installed in the Tube T. Accordingly, the user actuation portion (the first and second actuating portions 22 and 52) are operatively coupled to the first and second tube gripping portions 20 and 80 to move the first and second tube gripping portions 20 and 80 between the open release orientation and the tube gripping orientation. Further, the pressing part 40 is configured and arranged to push the tube insert I into the end part of the tube T during subsequent movement of the user actuation portion in a single movement of the user actuation portion from the open release orientation to a final tube insertion orientation.

In understanding the scope of the present invention, the term “configured” as used herein to describe a component, section or part of a device dimensioned to carry out the desired function. In understanding the scope of the present invention, the term “comprising” and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, “including”, “having” and their derivatives. Also, the terms “part,” “section,” “portion,” “member” or “element” when used in the singular can have the dual meaning of a single part or a plurality of parts. As used herein to describe the present invention, the following directional terms “forward, rearward, above, downward, vertical, horizontal, below and transverse" as well as any other similar directional terms refer to those directions of a to according to the tool of the present invention. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A tube insert installing tool comprising:

a first tube gripping portion configured to engage an end part of a tube;

a second tube gripping portion configured to engage the end part of the tube;

a tube insert supporting portion configured to support a tube insert; and a user actuation portion operatively coupled to the first and second tube gripping portions to move the first and second tube gripping portions between an open release orientation and a tube gripping orientation, the user actuation portion including an insert pressing part configured and arranged to push the tube insert supported by the tube insert supporting portion into the end part of the tube during subsequent movement of the user actuation portion in a single movement of the user actuation portion from the open release orientation to a final tube insertion orientation, the user actuation portion further including a contact portion that is configured and arranged to initially be spaced from the insert pressing part during movement from the open release orientation to the tube gripping orientation and to subsequently engage the insert pressing part during movement from the gripping orientation to the final tube insertion orientation to move the insert pressing part, which in turn urges the tube insert into the end part of the tube.

2. The tube insert installing tool as set forth in claim 1, wherein the first gripping portion includes a tube receiving recess; and the insert pressing part is configured to push the tube insert in a direction generally axially aligned with the tube receiving recess.

3. The tube insert installing tool as set forth in claim 1, wherein the user actuation portion includes a first handle and a second handle pivotally coupled to one another, the first gripping portion being fixedly coupled to a distal end of the first handle relative to the second handle.

4. The tube insert installing tool as set forth in claim 3, wherein the second tube gripping portion includes a lever part having a first pivot section pivotally coupled to the first handle and a second pivot section pivotally coupled to the second handle.

5. The tube insert installing tool as set forth in claim 3, further comprising a link having a first end pivotally coupled to the first handle and a second end pivotally coupled to the second handle.

6. The tube insert installing tool as set forth in claim 5, wherein the second tube gripping portion includes a lever part having a first pivot section pivotally coupled to the first handle and a second pivot section pivotally coupled to the second handle.

7. The tube insert installing tool as set forth in claim 3, wherein the first handle includes an elongated portion formed with a first projection and a second projection, the second tube gripping portion being pivotally coupled to the first projection and the second handle being pivotally coupled to the second projection.

8. The tube insert installing tool as set forth in claim 7, further comprising a link having a first end pivotally coupled to the second projection of the first handle and a second end pivotally coupled to the second handle.

9. The tube insert installing tool as set forth in claim 8, wherein the second tube gripping portion includes a lever part having a first pivot section pivotally coupled to the first projection of the first handle and a second pivot section pivotally coupled to the second handle.

10. The tube insert installing tool as set forth in claim 7, wherein the tube insert supporting portion is fixedly attached to the first handle between the first projection and the first tube gripping portion.

11. The tube insert installing tool as set forth in claim 7, wherein the first projection extends a first distance away from the from the elongated portion and the second projection extends a second distance away from the elongated portion, the first distance being greater than the second distance.

12. The tube insert installing tool as set forth in claim 1, further comprising a link having a first end pivotally coupled to the first grip portion and a second end pivotally coupled to the second grip portion to support the second grip portion in a spaced apart relationship from the first grip portion.

13. A tube insert installing tool comprising:

a first tube gripping portion configured to engage an end part of a tube;

a second tube gripping portion configured to engage the end part of the tube;

a tube insert supporting portion configured to support a tube insert;

a user actuation portion operatively coupled to the first and second tube gripping portions to move the first and second tube gripping portions between an open release orientation and a tube gripping orientation, and a link having a first end pivotally coupled to the first grip portion and a second end pivotally coupled to the second grip portion to support the second grip portion in a spaced apart relationship from the first grip portion, the user actuation portion including an insert pressing part configured and arranged to push the tube insert supported by the tube insert supporting portion into the end part of the tube during subsequent movement of the user actuation portion in a single movement of the user actuation portion from the open release orientation to a final tube insertion orientation.

14. The tube insert installing tool as set forth in claim 13, wherein the first gripping portion includes a tube receiving recess; and the insert pressing part is configured to push the tube insert in a direction generally axially aligned with the tube receiving recess.

15. The tube insert installing tool as set forth in claim 13, wherein the user actuation portion includes a first handle and a second handle pivotally coupled to one another, the first gripping portion being fixedly coupled to a distal end of the first handle relative to the second handle.

16. The tube insert installing tool as set forth in claim 15, wherein the second tube gripping portion includes a lever part having a first pivot section pivotally coupled to the first handle and a second pivot section pivotally coupled to the second handle.

17. The tube insert installing tool as set forth in claim 15, wherein the first handle includes an elongated portion formed with a first projection and a second projection, the second tube gripping portion being pivotally coupled to the first projection and the second handle being pivotally coupled to the second projection.

18. The tube insert installing tool as set forth in claim 17, wherein the tube insert supporting portion is fixedly attached to the first handle between the first projection and the first tube gripping portion.

19. The tube insert installing tool as set forth in claim 17, wherein the first projection extends a first distance away from the from the elongated portion and the second projection extends a second distance away from the elongated portion, the first distance being greater than the second distance.

20. The tube insert installing tool as set forth in claim 13, wherein the user actuation portion includes a contact portion that is configured and arranged to initially be spaced from the insert pressing part during movement from the open release orientation to the tube gripping orientation and to subsequently engage the insert pressing part during movement from the gripping orientation to the final tube insertion orientation to move the insert pressing part, which in turn urge the tube insert into the end part of the tube.

* * * * *